United States Patent
Yamamoto

(10) Patent No.: US 8,159,603 B2
(45) Date of Patent: Apr. 17, 2012

(54) IMAGE CAPTURING APPARATUS WITH FRAME FOR SEALING BETWEEN OPTICAL MEMBER AND IMAGE SENSOR

(75) Inventor: Hideaki Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 11/858,256

(22) Filed: Sep. 20, 2007

(65) Prior Publication Data

US 2008/0079812 A1  Apr. 3, 2008

(30) Foreign Application Priority Data

Oct. 2, 2006 (JP) ................................. 2006-271304

(51) Int. Cl.
*H04N 5/225* (2006.01)

(52) U.S. Cl. .................. 348/374; 348/207.99; 348/373; 348/335

(58) Field of Classification Search ............. 348/207.99, 348/374, 373, 335
See application file for complete search history.

(56) References Cited

U.S. PATENT DOCUMENTS

| | | |
|---|---|---|
| 7,006,138 B2 | 2/2006 | Kawai |
| 2003/0169333 A1* | 9/2003 | Yazawa et al. .................. 348/65 |
| 2003/0214599 A1* | 11/2003 | Ito et al. ........................ 348/335 |
| 2004/0041915 A1* | 3/2004 | Mogamiya et al. ....... 348/207.99 |
| 2005/0280712 A1* | 12/2005 | Kawai ....................... 348/207.99 |
| 2006/0017818 A1* | 1/2006 | Enomoto .................... 348/219.1 |
| 2007/0103579 A1* | 5/2007 | Niwamae et al. ............. 348/335 |

FOREIGN PATENT DOCUMENTS

| | | |
|---|---|---|
| JP | 04-037053 A | 2/1992 |
| JP | 2002-204379 A | 7/2002 |
| JP | 2003-319222 | 11/2003 |

OTHER PUBLICATIONS

Entry-Level digital SLR camera, WITH 10.1-MEGAPIXEL CMOS sensor, EOS Integrated Cleaning System and Picture Style, URL: http://web.canon.jp/camera-muse/tech/report/200609/report.html.

Japanese document and English version. (URL:http://www.canon.com/camera-museum/tech/report/200609/report.html).

The above references (Foreign Patent claimants 1 and 2: and non-patent literature document 1) were cited in an Nov. 21, 2008 Japanese Office Action that issued in japanese Patent Application 2006-271304.

* cited by examiner

*Primary Examiner* — Usman Khan

(74) *Attorney, Agent, or Firm* — Cowan, Liebowitz & Latman, P.C.

(57) ABSTRACT

An optical member is provided, in front of an image sensor to convert an optical image of an object into an electric signal, and on a photographing optical axis. The optical member is vibrated, thereby foreign substances attached to the optical member are removed. Further, a frame member is held between the optical member and the image sensor. In the frame member, a first pair of opposing sides are brought into contact with the optical member at nodes of vibration of the optical member. The thickness of a second pair of opposing sides in a direction of the photographing optical axis is thicker than that of the first pair of opposing sides.

18 Claims, 14 Drawing Sheets

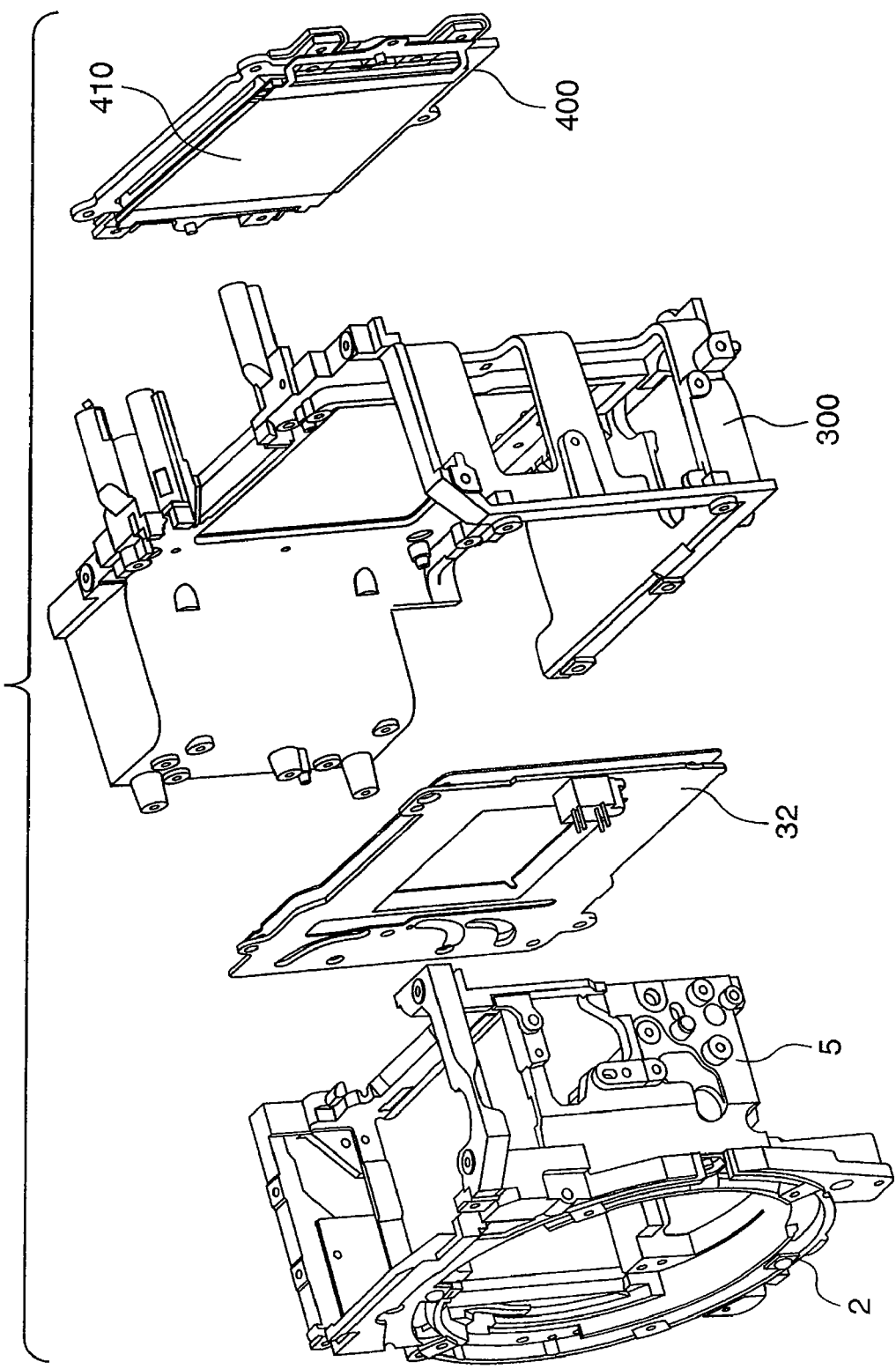

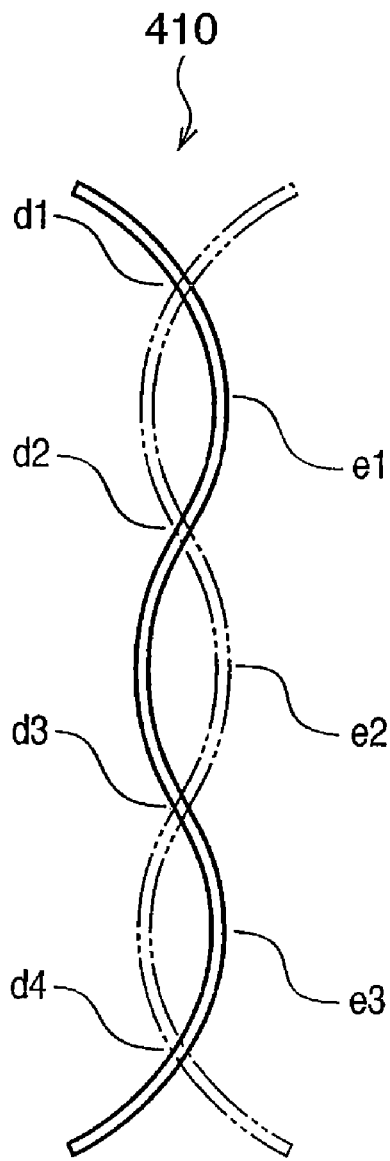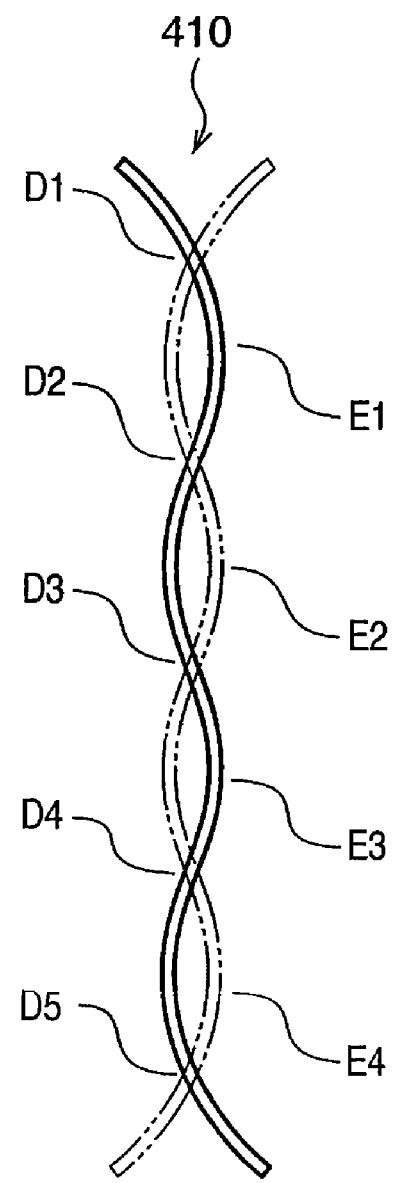
FIFTH ORDER MODE
SIXTH ORDER MODE
F I G. 10A
F I G. 10B

410

IMAGE CAPTURING APPARATUS WITH FRAME FOR SEALING BETWEEN OPTICAL MEMBER AND IMAGE SENSOR

BACKGROUND OF THE INVENTION

1. Field of the Invention

The present invention relates to an image capturing apparatus, and more particularly, to a technique of removing foreign substances such as dust attached to an optical member provided on a photographing optical axis.

2. Description of the Related Art

In an image capturing apparatus such as a digital camera which performs image sensing by converting an image signal into an electric signal, a light beam is received with an image sensor such as a CCD or a CMOS, then a photoelectric-converted electric signal, output from the image sensor, is converted into image data, and stored on a storage medium such as a memory card. In this image capturing apparatus, an optical low-pass filter, an infrared filter or the like is provided on the object side of the image sensor. When a foreign substance such as dust is attached to the cover glass of the image sensor and/or the surface of the filter, the shadow of the substance appears as a black spot in an obtained image, which degrades the quality of the image.

Particularly, in a lens-interchangeable single lens reflex digital camera, mechanical units such as a shutter and a quick return mirror are provided around the image sensor, and foreign substances such as dust from these mechanical units may be attached to the image sensor, the low-pass filter and the like. Further, upon lens exchange, dust and the like may enter from an opening of a lens mount into the camera main body, and may be attached to the image sensor, the low-pass filter and the like.

Japanese Patent Application Laid-Open No. 2003-319222 discloses a camera in which a dustproof curtain to pass a light beam is provided on the object side of the image sensor, and foreign substances attached to the surface of the dustproof curtain are removed by vibrating the dustproof curtain with a piezoelectric element.

According to the above conventional technique, to remove foreign substance attached to the surface of the dustproof curtain, a voltage is applied to the piezoelectric element connected to the dustproof curtain to drive the piezoelectric element, and the dustproof curtain is displaced in an optical axis direction, thus causing curtain vibration. However, as this technique causes curtain vibration by displacing the dustproof curtain in the optical axis direction, a vibration mode becomes complicated and vibration efficiency is lowered when the dustproof curtain has a shape other than a round shape.

Generally, the effective image sensing range of an image capturing apparatus has a rectangular shape with an aspect ratio of 4:3, 3:2 or the like. The effective light beam necessary for image sensing also has a rectangular shape. Accordingly, the round-shaped dustproof curtain has a large size with respect to the effective light beam in order to appropriately pass the light beam having the rectangular shape. It is disadvantageous in terms of convenience of layout to have such round dustproof curtain inside the image capturing apparatus, and such an inefficient layout causes an increase in the size of the image capturing apparatus.

Further, according to the above conventional technique, in addition to the inconvenience of layout, disadvantages in terms of production cost, optical function and optical performance are also created, as the necessity of the special member, the dustproof curtain, on the optical axis increases the number of parts, reduces the light beam transmissivity, and the like. Further, as high electric power is required to vibrate the dustproof curtain which is large with respect to the effective light beam, battery consumption is increased by the foreign substance removal operation.

SUMMARY OF THE INVENTION

An aspect of the present invention is to eliminate the above-mentioned conventional problems.

Another aspect of the present invention is to provide an image capturing apparatus which is further downsized, and in which foreign substances such as dust attached to an optical member provided on an optical axis can be removed with lower electric power without impairing optical performance.

According to an aspect of the present invention, there is provided an image capturing apparatus, comprising: an image sensor configured to convert an optical image of an object into an electric signal; an optical member provided in front of the image sensor and on a photographing optical axis; a vibration unit configured to apply vibration to the optical member; and a frame member, having a rectangular opening to pass the optical image through an image sensing surface of the image sensor, held between the optical member and the image sensor, wherein in the frame member, a first pair of opposing sides are brought into contact with the optical member at nodes of vibration of the optical member vibrating by the vibration of the vibration unit, and a thickness of a second pair of opposing sides different from the first pair of opposing sides in a direction of the photographing optical axis is thicker than that of the first pair of opposing sides in the direction of the photographing optical axis.

Further, according to an aspect of the present invention, there is provided an image capturing apparatus, comprising: an image sensor configured to convert an optical image of an object into an electric signal; an optical member provided in front of the image sensor and on a photographing optical axis; a vibration unit configured to apply vibration to the optical member; and a frame member, having a rectangular opening to pass the optical image through an image sensing surface of the image sensor, held between the optical member and the image sensor, wherein in the frame member, a first pair of opposing sides are brought into contact with the optical member at nodes of vibration of the optical member vibrating by the vibration of the vibration unit, and a width of a second pair of opposing sides different from the first pair of opposing sides in a surface orthogonal to the photographing optical axis is wider than that of the first pair of opposing sides in the surface orthogonal to the photographing optical axis.

Furthermore, according to an aspect of the present invention, there is provided an image capturing apparatus, comprising: an image sensor configured to convert an optical image of an object into an electric signal; an optical member provided in front of the image sensor and on a photographing optical axis; a vibration unit configured to apply vibration to the optical member; and a frame member, having a rectangular opening to pass the optical image through an image sensing surface of the image sensor, held between the optical member and the image sensor, wherein in the frame member, a first pair of opposing sides are brought into contact with the optical member at nodes of vibration of the optical member vibrating by the vibration of the vibration unit, and rigidity of a second pair of opposing sides different from the first pair of opposing sides is lower than that of the first pair of opposing sides.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 depicts an exploded perspective view schematically showing a structure of the single lens reflex digital camera according to the first embodiment of the present invention;

FIGS. 10A and 10B depict side views showing vibration forms of an optical low-pass filter;

DESCRIPTION OF THE EMBODIMENTS

Numerous embodiments of the present invention will be described in detail below with reference to the accompanying drawings. The following embodiments are not intended to limit the claims of the present invention.

First Embodiment

Figure 1:
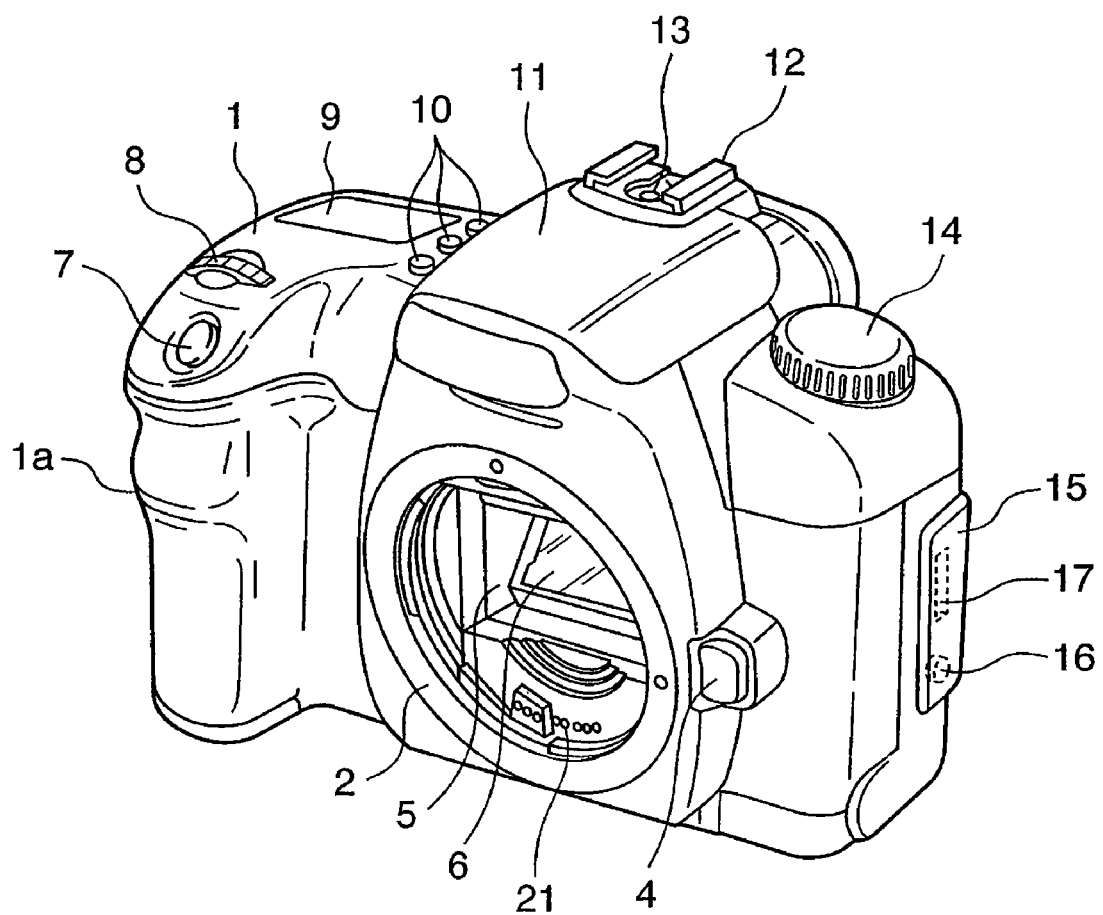
FIG. 1 depicts a perspective view showing outer appearance of a single lens reflex digital camera according to a first embodiment of the present invention, viewed from the camera front side.
Figure 2:
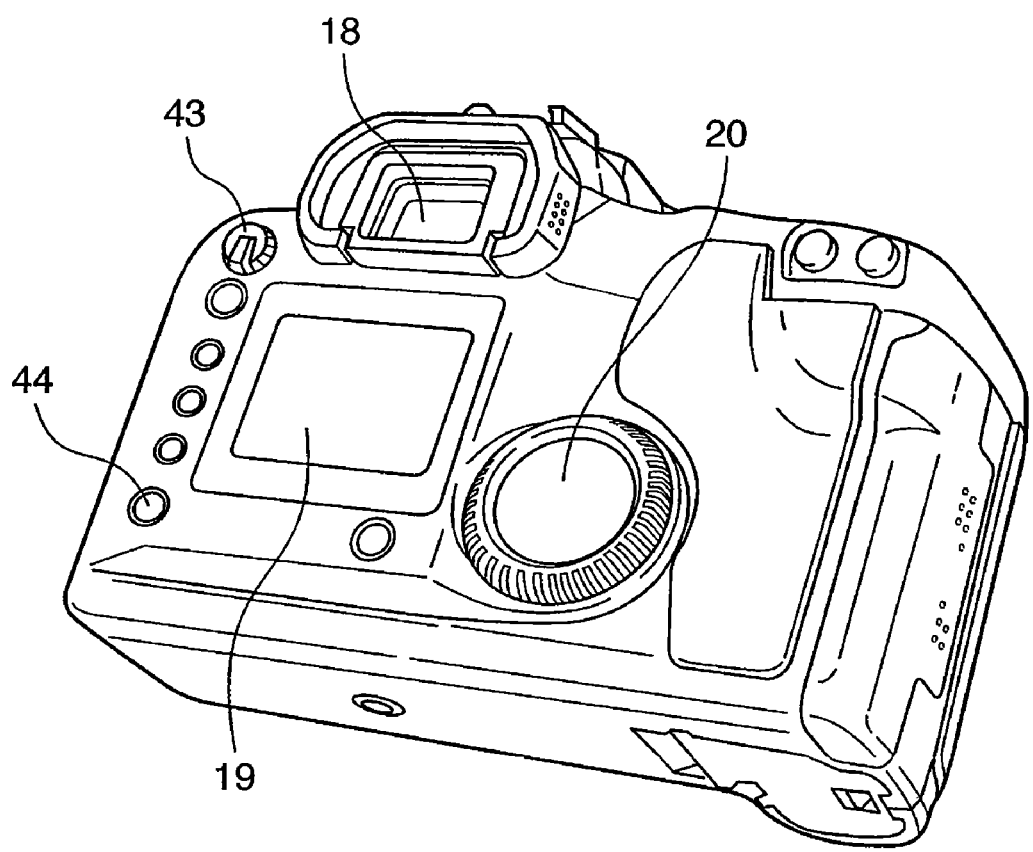
FIG. 2 depicts a rear surface perspective view showing the outer appearance of the single lens reflex digital camera according to the first embodiment of the present invention.

FIGS. 1 and 2 depict perspective views showing the outer appearance of a single lens reflex digital camera according to a first embodiment of the present invention. More particularly, FIG. 1 is a perspective diagram viewed from the camera front surface side, showing the camera from which a photographing lens unit is removed. FIG. 2 is a perspective diagram viewed from the camera rear surface side.

In FIG. 1, reference numeral 1 denotes a camera main body provided with a grip 1a projected frontward such that a user can stably hold the camera upon photographing; numeral 2 denotes a lens mount to fix a removable photographing lens unit (not shown) to the camera main body 1; and numeral 21 denotes a mount contact having a function of transmitting/receiving a control signal, a status signal, a data signal and the like between the camera main body 1 and the photographing lens unit, and a function of supplying electric power to the photographing lens unit side. Further, the mount contact 21 may be capable of optical communication, audio communication or the like in addition to the electrical communication.

Figure 3A:
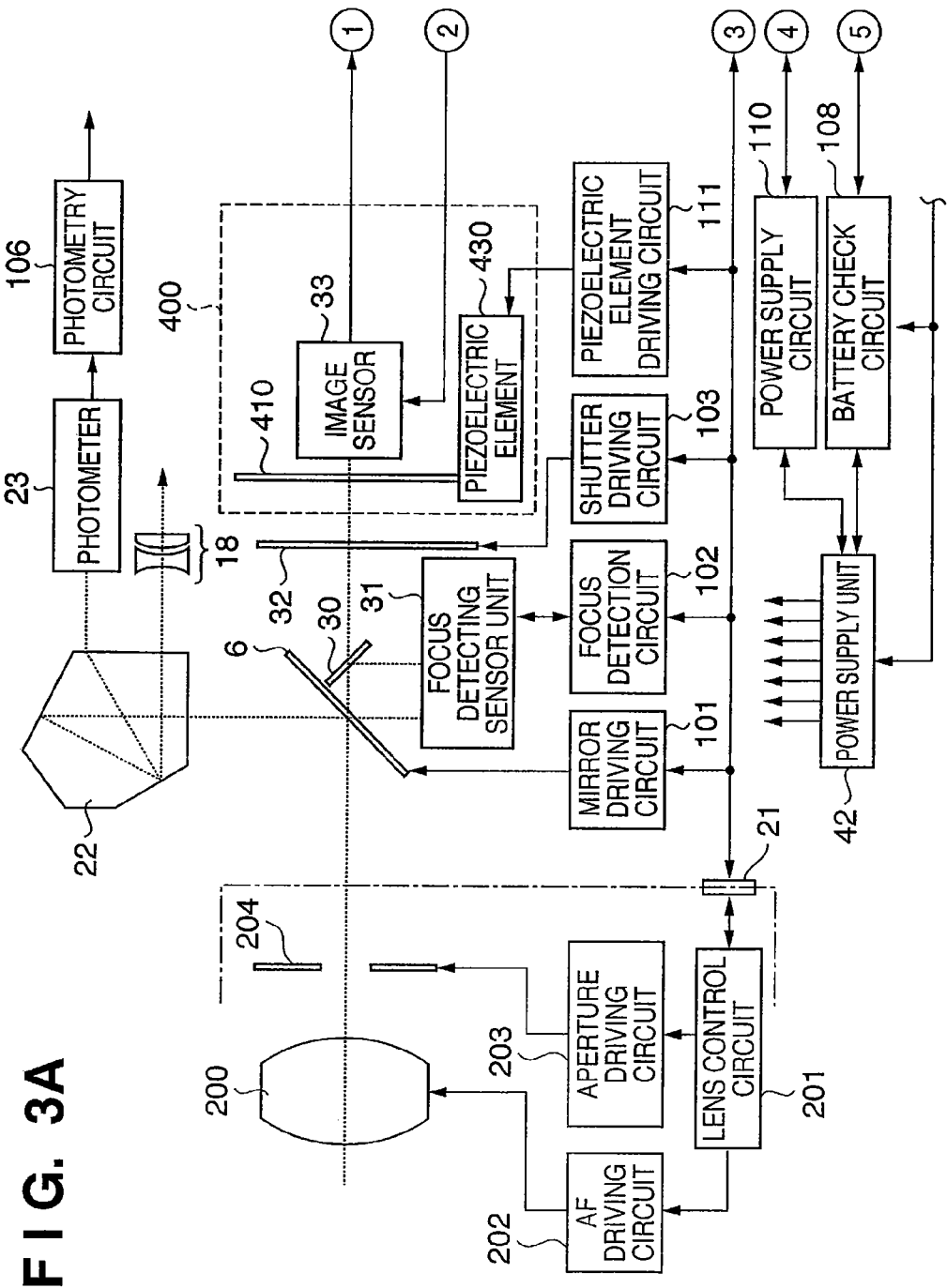
FIGS. 3A and 3B are block diagrams showing a primary electric configuration of the single lens reflex digital camera according to the first embodiment of the present invention.

Numeral 4 denotes a lens lock release button to be depressed upon removal of the photographing lens unit. Numeral 5 denotes a mirror box provided inside the camera case, in which a light beam passed through the photographing lens is guided. A quick return mirror 6 is provided inside the mirror box 5. The quick return mirror 6 is held in a 45 degree angle position with respect to an optical axis so as to guide the light beam in a direction of a pentaprism 22 (FIG. 3A), and held in a position withdrawn from the light beam so as to guide the light beam in a direction of an image sensor 33 (FIG. 3A).

A shutter button 7 as a photographing start switch, a main operation dial 8 for setting a shutter speed, an aperture value and the like in accordance with an operation mode upon photographing, and photographing system operation mode setting buttons 10, are provided on the side of the grip 1a in an upper part of the camera. A part of the results of operations with these operation members are displayed on an LCD display panel 9.

The shutter button 7 has a structure where a switch SW 1 (7a in FIG. 3B) is turned ON with a first stroke (half stroke), and a switch SW 2 (7b in FIG. 3B) is turned ON with a second stroke (full stroke).

Further, the operation mode setting buttons 10 are used for setting of continuous shooting/one-frame shooting with one depression of the shutter button 7, setting of self-photographing mode or the like. The setting status is displayed on the LCD display panel 9.

A strobe unit 11 which is popped up with respect to the camera main body, a shoe groove 12 for attachment of a flash member, and a flash contact 13 are provided in an upper central part of the camera. Further, a photographing mode setting dial 14 is provided in an upper (right part in FIG. 1) of the camera.

An openable/closable external terminal cover 15 is provided on a side surface opposite to the grip 1a side, and a video signal output jack 16 and a USB output connector 17 as external interfaces are provided in a position under the external terminal cover 15.

In FIG. 2, a viewfinder eyepiece window 18 is provided in an upper position of a camera rear surface, and a color LCD monitor 19 capable of image display is provided around a central position of the rear surface. A sub operation dial 20 provided beside the color LCD monitor 19 performs auxiliary functions of the main operation dial 8. For example, in an AE mode of the camera, the sub operation dial 20 is used for setting an amount of exposure correction for a correct exposure value calculated with an automatic exposure device. Otherwise, in a manual mode in which a shutter speed and an aperture value are set as intended by the user, the shutter speed is set with the main operation dial 8 and the aperture value is set with the sub operation dial 20. Further, the sub operation dial 20 is used for display and selection of photographed images displayed on the color LCD monitor 19. Numeral 43 denotes a main switch to start or stop the operation of the camera. Numeral 44 denotes a cleaning mode designation member to actuate a cleaning mode for designating an operation to shake off foreign substance such as dust attached to an optical low-pass filter. Note that the cleaning mode will be described in detail later.

Figure 3B:
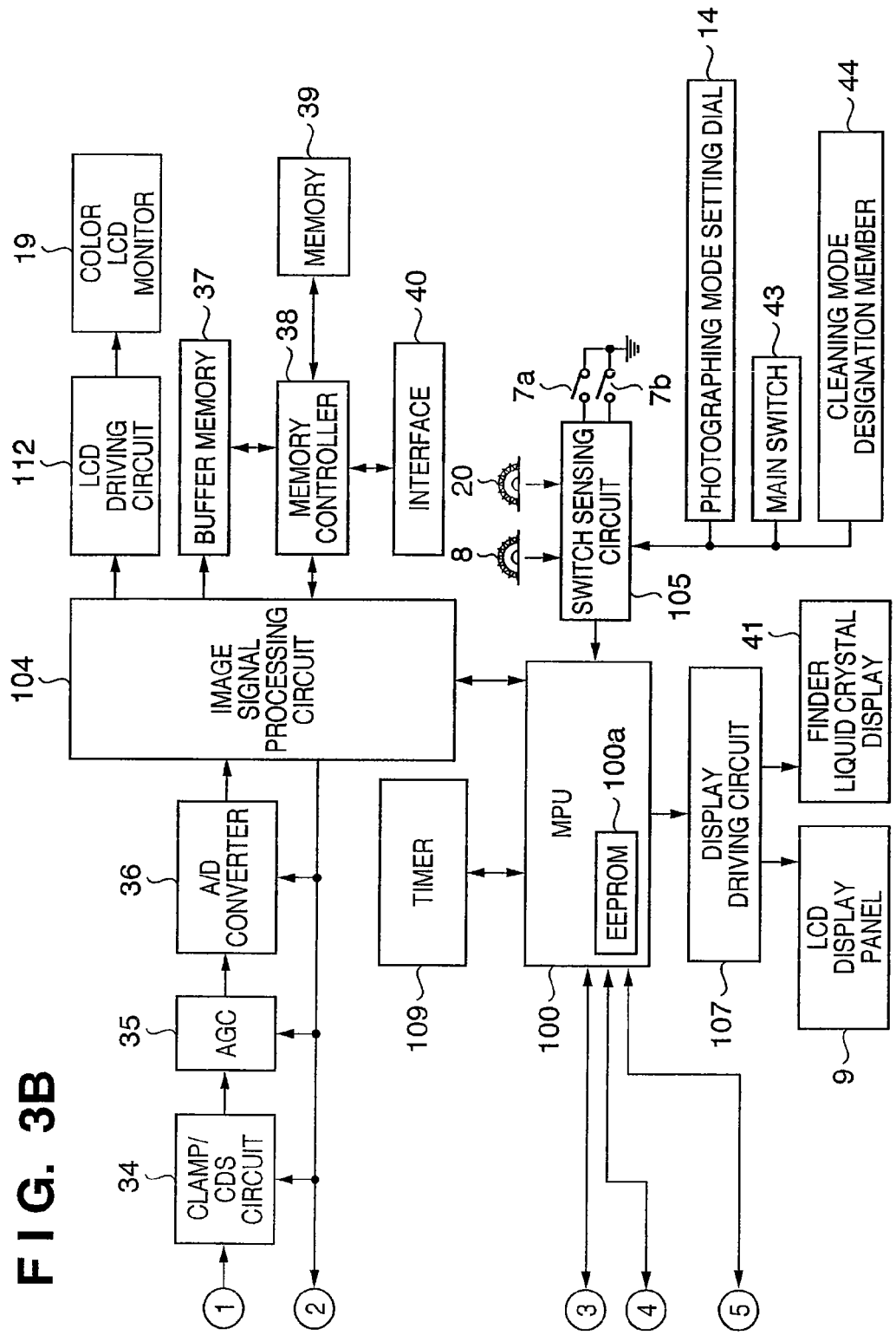

FIGS. 3A and 3B are block diagrams showing a primary electric configuration of the single lens reflex digital camera according to the present embodiment of the present invention. Note that constituent elements corresponding to those in the above-described figures have the same reference numerals.

Numeral 100 denotes a microprocessing unit (MPU) having a microcomputer incorporated in the camera main body 1. The MPU 100 controls the camera operations, and performs various processings and instructions for the respective elements. Numeral 100a denotes an EEPROM included in the MPU 100. The EEPROM 100a is capable of storing time measurement information obtained with a timer 109 and other information.

The MPU 100 is connected to a mirror driving circuit 101, a focus detection circuit 102, a shutter driving circuit 103, an image signal processing circuit 104, a switch sensing circuit 105, and a photometry circuit 106. Further, the MPU 100 is connected to a display driving circuit 107, a battery check circuit 108, the timer 109, a power supply circuit 110, and a piezoelectric element driving circuit 111. These circuits operate under the control of the MPU 100.

Further, the MPU 100 performs communication with a lens control circuit 201 provided in the photographing lens unit via the mount contact 21. The mount contact 21 has a function of transmitting a signal to the MPU 100 upon connection with the photographing lens unit. With this function, the lens control circuit 201 performs communication with the MPU 100, and drives a photographing lens 200 and an aperture 204 in the photographing lens unit via an AF driving circuit 202 and an aperture driving circuit 203. Note that in the present embodiment, the photographing lens 200 is illustrated as a single lens for the sake of convenience. However, the photographing lens 200 actually is a lens group including a large number of lenses.

The AF driving circuit 202, having, for example, a stepping motor, changes a focus lens position in the photographing lens 200 under the control of the lens control circuit 201, thereby focalizing the light beam on the image sensor 33. The aperture driving circuit 203, having, for example, an auto iris, changes the aperture 204 under the control of the lens control circuit 201, thereby obtaining an optical aperture value.

The quick return mirror 6 guides the light beam passing through the photographing lens 200 to the pentaprism 22, and guides a part of the transmitted light beam to a sub mirror 30. The sub mirror 30 guides the transmitted light beam to a focus detecting sensor unit 31.

The mirror driving circuit 101 drives the quick return mirror 6 to a position to enable the user to watch an object image through a finder and a position to withdraw from the light beam. At the same time of this driving operation, the mirror driving circuit 101 drives the sub mirror 30 to a position to guide the light beam to the focus detecting sensor unit 31 and to a position to withdraw from the light beam. More particularly, the mirror driving circuit 101 has, for example, a CD motor, a gear train and the like.

The focus detecting sensor unit 31 is a well-known phase-difference focus detecting sensor unit having a field lens, a reflecting mirror, a secondary image formation lens, an aperture, a line sensor having plural CCDs and the like provided around an image formation surface (not shown). A signal output from the focus detecting sensor unit 31 is supplied to the focus detection circuit 102, then converted to an object image signal and sent to the MPU 100.

The MPU 100 performs a focus detecting operation by a phase-difference detection method based on the object image signal. Then, the MPU 100 obtains a defocus amount and a defocus direction, and drives the focus lens in the photographing lens 200 to an in-focus position via the lens control circuit 201 and the AF driving circuit 202.

The pentaprism 22 is an optical member which convert-reflects the light beam reflected with the quick return mirror 6 into an erect image. The user can observe the object image from the viewfinder eyepiece window 18 via a finder optical system. Further, the pentaprism 22 guides a part of the light beam to a photometer 23. The photometry circuit 106 obtains an output from the photometer 23, converts the output into luminance signals in respective areas on an observation surface, and outputs the signals to the MPU 100. The MPU 100 calculates an exposure value from the obtained luminance signals.

Numeral 32 denotes a mechanical focal plane shutter which blocks the light beam when the user observes the object image from the finder. Further, upon image sensing, the focal plane shutter 32 obtains desired exposure time from the time difference between running of a group of front curtains (not shown) and that of a group of rear curtains (not shown), in correspondence with a release signal. The focal plane shutter 32 is controlled by the shutter driving circuit 103 in accordance with a command from the MPU 100.

Numeral 33 denotes an image sensor using, for example, a CMOS as an image sensing device. As the image sensing device, various types of devices such as CCD, CMOS and CID devices are known, and any type of image sensing device may be employed. Numeral 34 denotes a clamp/CDS (Correlation Double Sampling) circuit which performs basic analog processing prior to A/D conversion. The clamp level is changeable. Numeral 35 denotes an AGC (Auto Gain Control) circuit which performs basic analog processing prior to A/D conversion. The AGC basic level is changeable. Numeral 36 denotes an A/D converter which converts an analog output signal from the image sensor 33 into a digital signal.

Numeral 410 denotes an optical low-pass filter formed by bonding plural birefringent plates and phase plates together and further attaching an infrared filter. Note that in the present embodiment, an optical low-pass filter having an integrated infrared filter, liquid crystal and the like is used as the optical low-pass filter 410, however, the present invention is not limited to this arrangement. For example, the optical low-pass filter may be divided into plural optical device members. In such case, an optical device provided on an outermost surface of a sealed structure including the image sensor is vibrated with a piezoelectric element to be described later.

Numeral 430 denotes a piezoelectric element which is vibrated with a piezoelectric element driving circuit 111 in accordance with a command from the MPU 100, integrally with the optical low-pass filter 410. Numeral 400 denotes an image sensing unit, including the optical low-pass filter 410, the piezoelectric element 430, the image sensor 33 and other members to be described later. The detailed structure of the image sensing unit 400 will be described later.

The image signal processing circuit 104 performs general hardware image processing such as gamma/knee processing, filter processing, and information combining processing for monitor display, on the digitized image data. The image data for monitor display from the image signal processing circuit 104 is displayed on the color LCD monitor 19 via an LCD driving circuit 112. Further, the image signal processing circuit 104 may store the image data through a memory controller 38 into a buffer memory 37 in accordance with an instruction from the MPU 100. Further, the image signal processing circuit 104 has a function of performing image data compression processing such as JPEG compression. When photographing is continuously performed upon, for example, continuous shooting, the image signal processing circuit 104 may temporarily store image data into the buffer memory 37 and then sequentially read unprocessed image data through the memory controller 38. In this arrangement, the image signal processing circuit 104 can sequentially perform image processing, compression processing and the like regardless of the speed of image data inputted from the A/D converter 36.

The memory controller 38 has a function of storing image data input from the interface 40 (corresponding to the video signal output jack 16 and the USB output connector 17 in FIG. 1) into a memory 39. Further, the memory controller 38 also has a function of outputting image data stored in the memory 39 from the interface 40. Note that the memory 39 is a flash memory or the like which is attachable/removable to/from the camera main body 1.

The switch sensing circuit 105 transmits an input signal to the MPU 100 in correspondence with operation statuses of the respective switches. The switch 7a is a switch SW 1 which is turned ON with a first stroke (half stroke) of the shutter button 7. The switch 7b is a switch SW 2 which is turned ON with a second stroke (full stroke) of the shutter button 7. When the switch SW 2 is turned ON, the MPU 100 is instructed to start photographing. Further, the main operation dial 8, the sub operation dial 20, the photographing mode setting dial 14, the main switch 43 and the cleaning mode designation member 44 are connected to the switch sensing circuit 105.

The display driving circuit 107 drives the LDC display panel 9 and a liquid crystal display finder 41 in accordance with instructions from the MPU 100.

The battery check circuit 108 performs battery checking for a predetermined period in accordance with a signal from the MPU 100, and sends the result of checking to the MPU 100. Numeral 42 denotes a power supply unit which supplies necessary power to the respective elements of the camera.

The timer 109 measures the time from turn-off of the main switch 43 to the next turn-on of the main switch 43 and date, and transmits the result of measurement to the MPU 100 in accordance with a command from the MPU 100.

Next, the detailed structure of the image sensing unit 400 will be described below with reference to FIGS. 4 to 8, FIGS. 9A to 9C, FIGS. 10A and 10B and FIG. 11.

FIG. 4 depicts an exploded perspective view schematically showing the structure of the camera for explaining a holding structure around the image sensing unit 400 having the optical low-pass filter 410 and the image sensor 33.

On the object side of a main body chassis 300 as a frame of the camera main body 1, the mirror box 5 and the focal plane shutter 32 are provided sequentially from the object side, and the image sensing unit 400 is provided on the photographer side. In particular, the image sensing unit 400 is fixed such that an attachment surface of the lens mount 2, as a reference of attachment of the photographing lens unit, is away from an image sensing surface of the image sensor 33 by a predetermined distance and the attachment surface is parallel to the image sensing surface.

Figure 5:
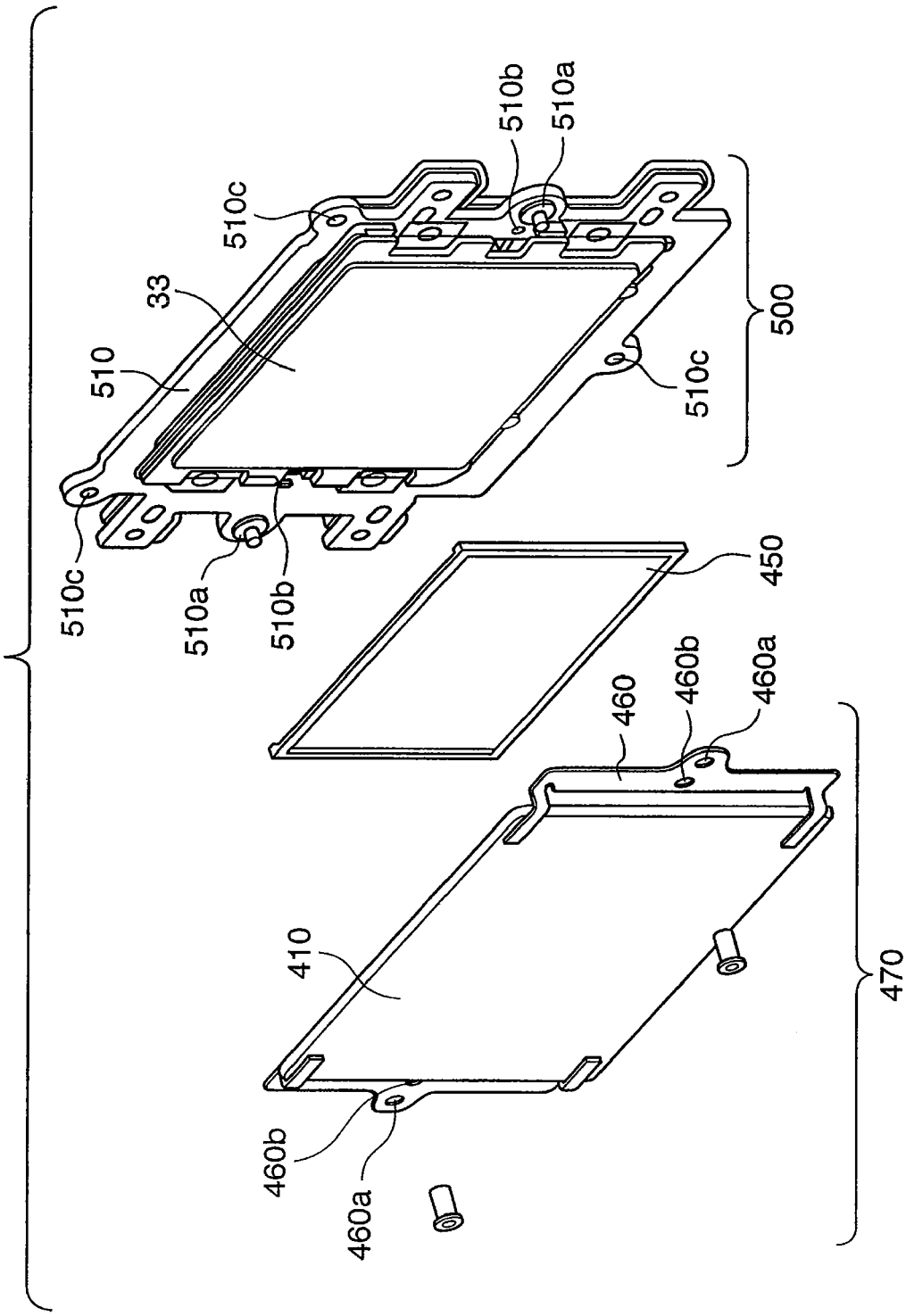
FIG. 5 depicts a perspective view showing a structure of an image sensing unit.

FIG. 5 depicts a perspective view showing the structure of the image sensing unit 400.

The image sensing unit 400 has a vibration unit 470, an image sensor unit 500 and a frame member 450. The image sensor unit 500 has at least the image sensor 33 and an image sensor holding member 510. Further, the vibration unit 470 has the optical low-pass filter 410, the piezoelectric element 430 (see FIG. 3A), a pressing member 460 and the like. The pressing member 460, formed of a metal member or the like having spring elasticity, is provided with a positioning hole 460a and a clearance hole 460b for screw fixing. The image sensor holding member 510 is provided with a positioning pin 510a and a screw hole 510b. Numeral 510c denotes an attachment hole to attach the image sensor unit 500 to the frame of the camera main body 1.

The vibration unit 470 is positioned with respect to the image sensor unit 500 using the positioning hole 460a of the pressing member 460 and the positioning pin 510a of the image sensor holding member 510. Further, the vibration unit 470 is fixed to the image sensor unit 500 with a screw, holding the frame 450 therebetween, using the clearance hole 460b for screw fixing of the pressing member 460 and the screw hole 510b of the image sensor holding member 510. A surface of the frame member 450 on the object side is in contact with the optical low-pass filter 410, and a surface on the photographer side is in contact with the image sensor 33. As the vibration unit 470 is pressed to the image sensor unit 500 side with spring elasticity of the pressing member 460, the frame member 450 and the optical low-pass filter 410 are in close contact without clearance. Also, the frame member 450 and the image sensor 33 are in close contact without clearance. In this arrangement, a clearance between the frame member 450 and the image sensor 33 is sealed with the frame member 450, thus a confined space that prevents foreign substances such as dust from entering is formed.

Figure 6:
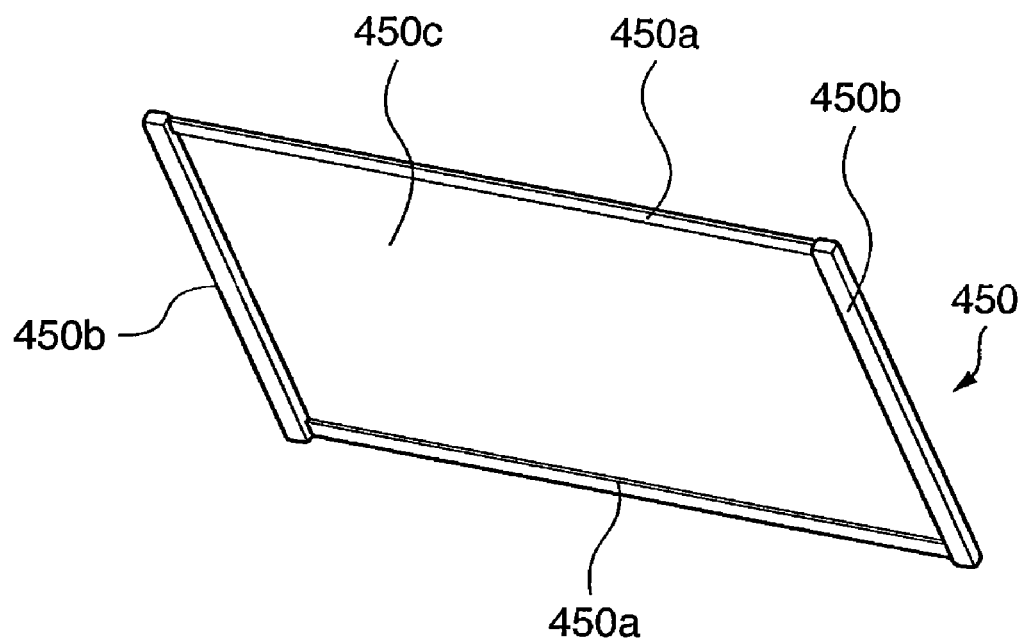
FIG. 6 depicts a perspective view showing a frame member according to the first embodiment of the present invention.

FIG. 6 depicts a perspective view showing the details of the frame member 450 according to the first embodiment of the present invention.

The frame member 450 has a rectangular opening 450c for exposure of the image sensor 33, sides 450a parallel to longer sides of the image sensor 33, and sides 450b orthogonal to the sides 450a. In the first embodiment, the thickness of the sides 450a and that of the sides 450b are different in an optical axis direction. More particularly, the thickness of the sides 450a is thinner than that of the sides 450b. These sides 450a and 450b of the frame member 450 require a sealing function to prevent entrance of foreign substances such as dust between the image sensor 33 and the optical low-pass filter 410, and a function of vibration absorbability so as not to transmit vibration of the optical low-pass filter 410 to the image sensor 33. Further, it is necessary to perform the above functions while keeping vibration of the optical low-pass filter 410 undisturbed as much as possible. The details to achieve the requirements will be described after the explanation of flexural vibration form of the optical low-pass filter 410.

Figure 7:
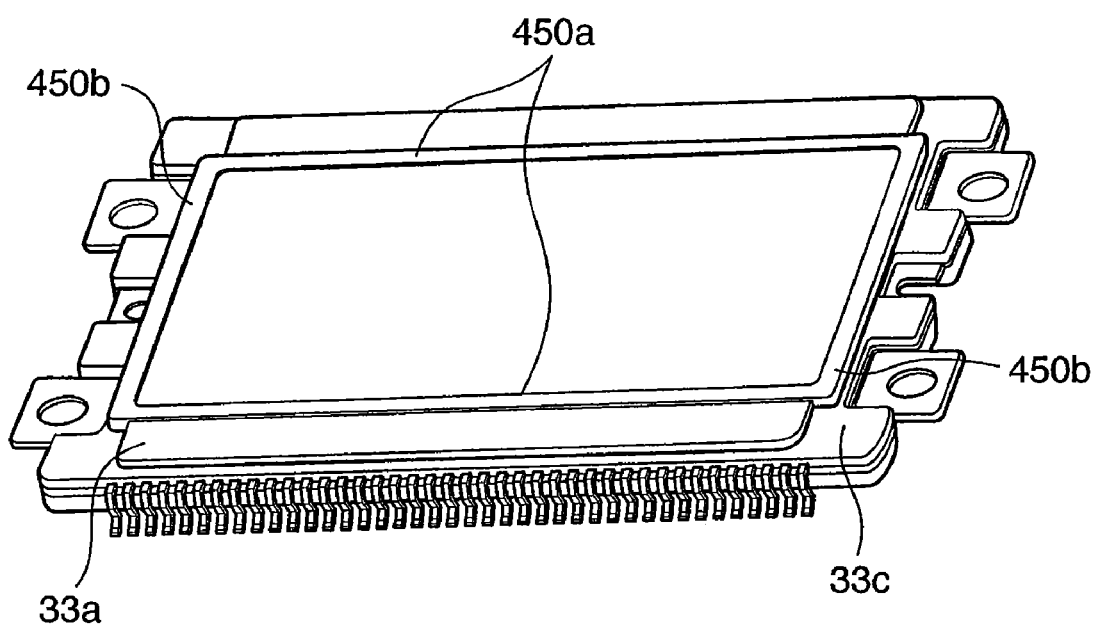
FIG. 7 depicts a perspective view showing the frame member and an image sensor constructing the image sensing unit.

FIG. 7 depicts a perspective view showing the frame member 450 and the image sensor 33 constituting the image sensing unit 400 (FIG. 4) according to the first embodiment.

In the image sensor 33, a sensor chip to receive object light is embedded inside a box-shaped package 33a formed of ceramic or the like. Cover glass 33c for protecting the sensor chip is fixed to the package 33a by adhesion bonding or the like. As the area of the cover glass 33c is sufficient as long as it covers the sensor chip, the cover glass 33c is smaller than the package 33a, and the image sensor 33 has a step portion where the thickness in the optical axis direction is different. More particularly, the thickness of the image sensor 33 in the portion where the cover glass 33c is attached is thick in the optical axis direction, and that in a portion where the cover glass 33c is not attached is thin in the optical axis direction. As shown in FIG. 7, the thin sides 450a of the frame member 450 shown in FIG. 6 are in contact with the cover glass 33c in the thick portion of the image sensor 33, while the thick sides 450b of the frame member 450 are in contact with the package 33a in the thin portion of the image sensor 33. In this arrangement, the entire thickness of the image sensing unit 400 can be approximately uniform, and the image sensor unit 500 can be made thinner.

Figure 8:
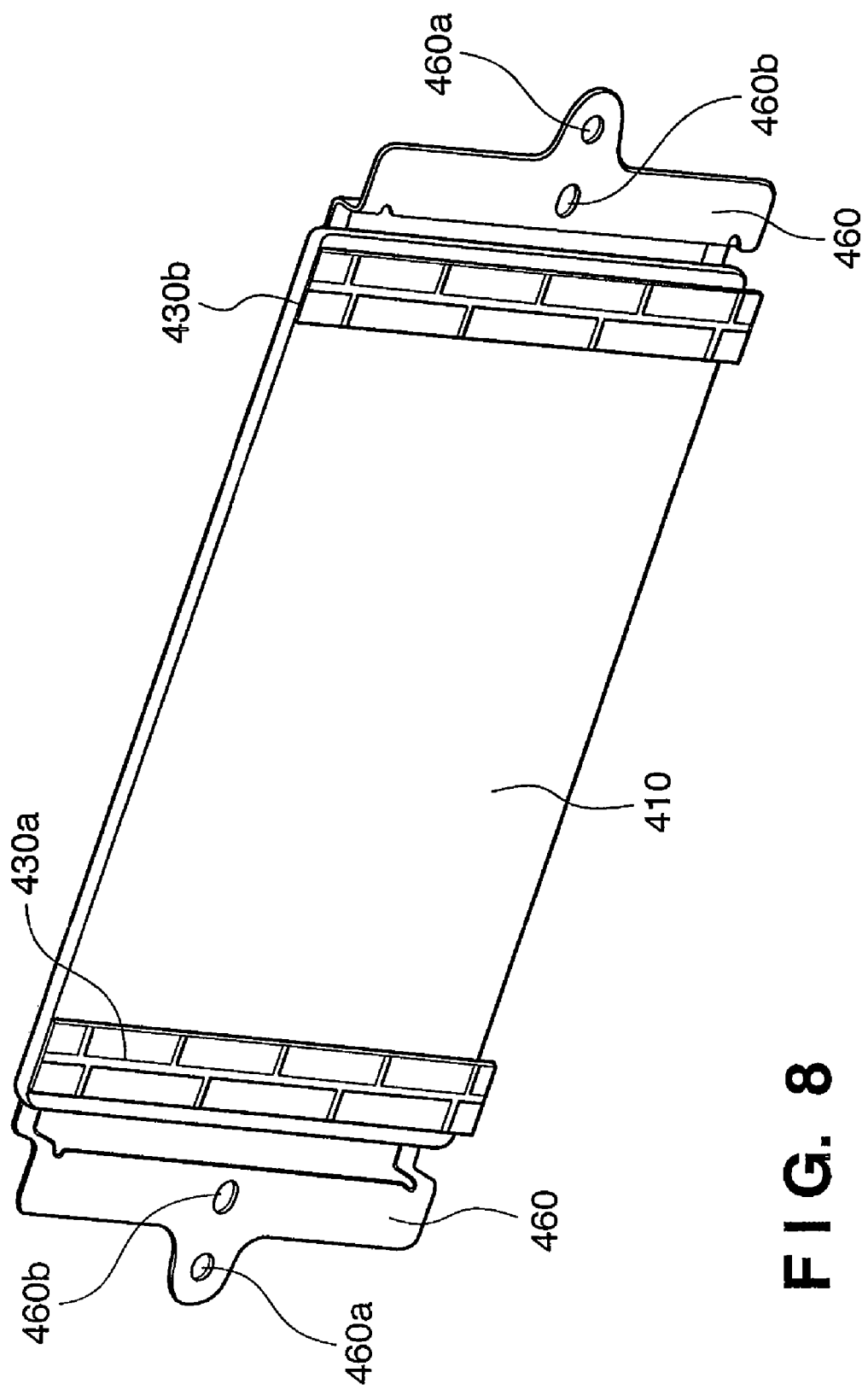
FIG. 8 depicts is a perspective view showing a detailed structure of a vibration unit.

FIG. 8 depicts a perspective view showing a detailed structure of the vibration unit 470 (FIG. 4) according to the first embodiment.

In FIG. 8, numerals 430a and 430b denote piezoelectric elements fixed to ends of the optical low-pass filter 410 with adhesive or the like. In the first embodiment, the two piezoelectric elements 430a and 430b having the same shape are fixed to both ends of the optical low-pass filter 410. The pressing member 460 is fixed to the optical low-pass filter 410 with adhesive or the like.

Figures 9A, 9B, 9C:
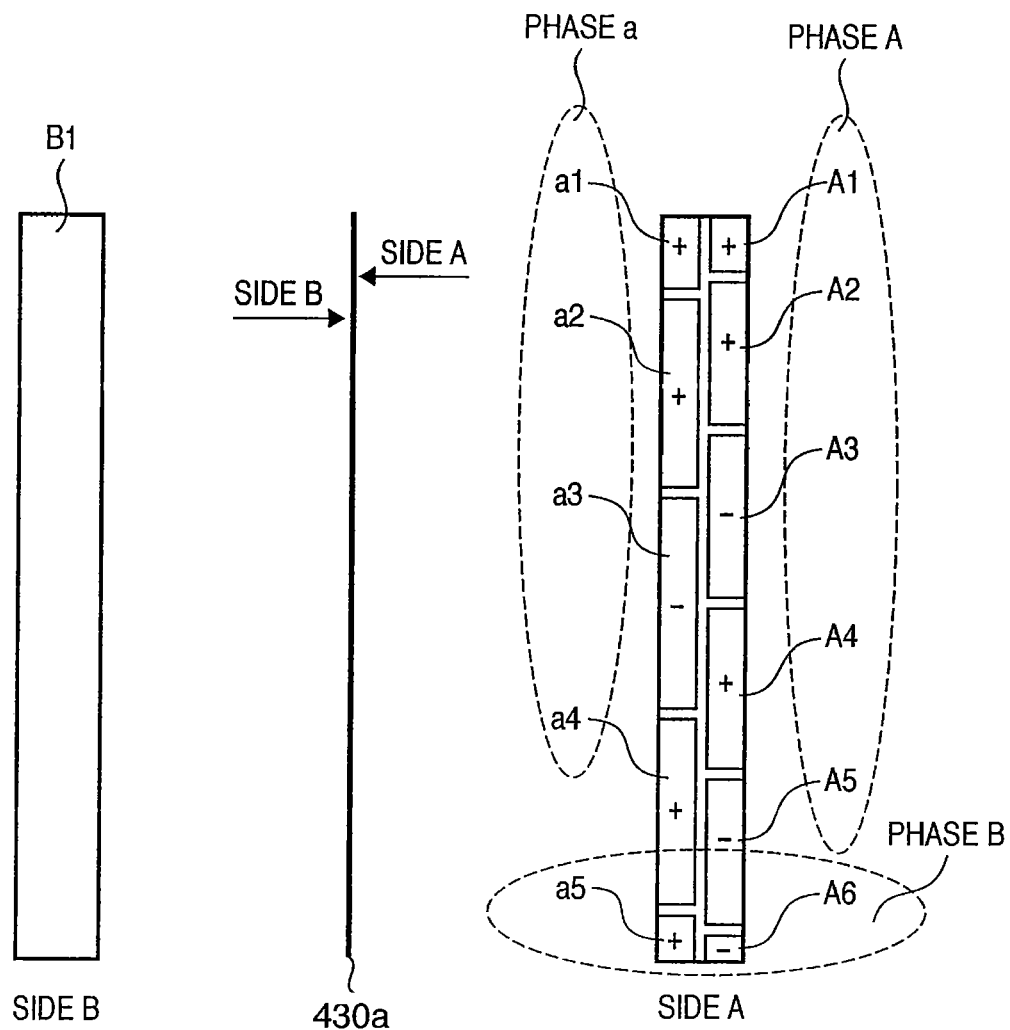
FIG. 9A depicts a plan view of a piezoelectric element according to the first embodiment in FIG. 9B viewed from the left side.
FIG. 9B depicts a side view of the piezoelectric element according to the first embodiment.
FIG. 9C depicts a plan view of the piezoelectric element according to the first embodiment in FIG. B viewed from the right side.

FIGS. 9A to 9C illustrate the details of the piezoelectric element 430a (or 430b). FIG. 9B depicts a side view of the piezoelectric element 430a (or 430b). FIG. 9A depicts a plan view of the piezoelectric element in FIG. 9B viewed from the left side. FIG. 9C depicts a plan view of the piezoelectric element in FIG. 9B viewed from the right side A (lens unit side). Hereinbelow, the piezoelectric element will be described in the case of the piezoelectric element 430a. As the piezoelectric element 430b has the same structure as that of the piezoelectric element 430a, the explanation of the piezoelectric element 430b will be omitted.

As shown in FIG. 9C, a side A of the piezoelectric element 430a is divided from its center into a phase a to excite fifth-order mode flexural vibration in the optical low-pass filter 410 and a phase A to excite sixth-order mode flexural vibration. In the respective phases, electrodes are divided at a λ/2 (λ is a wavelength) pitch of flexural vibration, and polarized by electrode in a thickness direction of the piezoelectric element 430a. Note that symbols "+" and "−" shown on the electrodes indicate polarization directions of the electrodes, and adjacent electrodes except the end electrodes a1, A1, a5 and A6 have mutually opposite polarities. Further, as shown in FIGS. 9A and 9B, an electrode B1 is formed on the entire side B of the piezoelectric element 430a.

The electrodes a1 to a4 are respectively electrically connected via conductive material (not shown) or the like, and respective electrodes are maintained at the same potential (phase-a electrodes). Similarly, the electrodes A1 to A5 are maintained at the same potential (phase-A electrodes). Further, the electrodes a5, A6 and B1 are maintained at the same potential (phase-B electrodes). A conductive coupling member such as a flexible print board (not shown) or the like is electrically and mechanically connected to the side A of the piezoelectric element 430a, so as to independently apply respectively predetermined voltages to the phase-a electrodes, the phase-A electrodes and the phase-B electrodes. Further, the side B of the piezoelectric element 430a is fixed to the optical low-pass filter 410 by adhesion or the like, such that the piezoelectric element 430a and the optical low-pass filter 410 integrally move.

Next, the mechanism of vibration of the optical low-pass filter 410 and vibration forms will be described with reference to FIGS. 10A and 10B and FIG. 11.

First, deformation of the piezoelectric element 430a when a positive voltage is applied to the phase-a electrodes (or phase-A electrodes) of the piezoelectric element 430a through the conductive coupling member and the-phase B electrodes are grounded (0V) will be described.

FIGS. 10A and 10B depict side views showing vibration forms of the optical low-pass filter 410. FIG. 11 depicts a perspective view showing the optical low-pass filter 410 when it vibrates in the fifth-order mode.

When the above-described voltage is applied, the "+" portions of the piezoelectric element 430a shown in FIG. 9C are contracted in a direction vertical to the surface of the piezoelectric element 430a and expanded in a direction in the surface of the piezoelectric element 430a. Accordingly, the optical low-pass filter 410 combined to the piezoelectric element 430a receives a force to expand its junction surface in the surface direction from the piezoelectric element 430a and is deformed such that the junction surface side to the piezoelectric element 430a has a convex shape. Similarly, the "−" portions of the piezoelectric element 430a shown in FIG. 9C are expanded in the direction vertical to the surface of the piezoelectric element 430a and contracted in the direction in the surface of the piezoelectric element 430a. Accordingly, the optical low-pass filter 410 combined with the piezoelectric element 430a receives a force to contract the junction surface in the surface direction from the piezoelectric element 430a and is deformed such that the junction surface side to the piezoelectric element 430a has a concave shape. When the above-described voltage is applied to the phase-a electrodes, fifth-order mode flexural deformation as indicated with a solid line in FIG. 10A occurs in the optical low-pass filter 410. Further, when the voltage is applied to the phase-A electrodes, sixth-order mode flexural deformation as indicated with a solid line in FIG. 10B occurs in the optical low-pass filter 410. Similarly, when the voltage applied to the phase-a (or A) electrodes is negative, the piezoelectric element 430a is deformed in directions opposite to the directions as above, and flexural deformation as indicated with a broken line in FIGS. 10A and 10B occurs in the optical low-pass filter 410.

That is, when the voltage applied to the phase-a electrodes (or phase-A electrodes) is periodically changed between positive and negative values while the potential of the phase-B electrodes B1 is grounded, flexural deformation such that the convex/concave shape of the optical low-pass filter 410 is periodically changed occurs. When the frequency of the periodical voltage is set at around a resonance frequency of a natural mode of the optical low-pass filter 410, a large amplitude can be obtained with a lower voltage. In other words, it is possible to vibrate the optical low-pass filter 410 more efficiently with a lower electric power to remove dust or the like attached to the optical low pass filter 410.

As shown in FIGS. 10A and 10B, in the flexural vibration, vibration nodes d1 to d4 and D1 to D5 and vibration loops e1 to e3 and E1 to E4 occur, and the amplitude of the vibration nodes d1 to d4 and D1 to D5 is substantially zero. As the amplitude of the vibration nodes d1 to d4 and D1 to D5 is substantially zero, the foreign substance such as dust attached to the optical low-pass filter 410 cannot be removed. Accordingly, by causing plural mode flexural vibrations with mutually different node positions, the foreign substance such as dust can be removed from the entire optical low-pass filter 410 within an image sensing field of view. The resonance frequency of the natural mode of the optical low-pass filter 410 differs in accordance with shape, plate thickness, material and the like of the optical low-pass filter 410. To prevent occurrence of discomforting noise, it is preferable to select a natural mode in which the resonance frequency is outside of the audible spectrum. In the present embodiment, the fifth-order mode vibration and the sixth-order mode vibration are employed, however, vibration of other modes may be employed, or two or more types of vibration modes may be employed.

As described above, according to the first embodiment, as foreign substance such as dust is removed by vibrating the rectangle optical low-pass filter 410 which has an optical function necessary for image sensing and which is originally provided in an image sensing device, there is no probability of degradation of optical performance such as light beam transmittivity. Further, as the optical low-pass filter 410, which has a rectangular shape approximately the same as that of effective light beam necessary for image sensing, is vibrated, the conventional inefficient layout using a round dustproof curtain becomes unnecessary. Thus, an increase in the size of an image sensing device can be prevented.

Further, in the first embodiment, flexural vibration is excited in the optical low-pass filter 410, formed by bonding birefringent plates, phase-plates and an infrared filter, so as to remove the foreign substance. However, it may be arranged such that flexural vibration is excited in a single birefringent plate or infrared filter.

Next, the structure of the frame member 450 will be described in more detail. As described above, the frame member 450 requires sealing performance to prevent entrance of foreign substance such as dust between the image sensor 33 and the optical low-pass filter 410. Further, it is necessary for the frame member 450 to perform the function of vibration absorbability not to transmit vibration of the optical low-pass filter 410 to the image sensor 33, while keeping the vibration of the optical low-pass filter 410 undisturbed as much as possible.

Accordingly, it is preferable to bring the optical low-pass filter 410 and the frame member 450 into contact at nodes of flexural vibration where the vibration amplitude is substantially zero so as to keep vibration of the optical low-pass filter 410 undisturbed as much as possible. In continuous order modes such as fifth-order mode and sixth-order mode, the outermost node of respective modes appears in approximately the same position. More particularly, in FIGS. 10A and 10B, the nodes d1 and D1, and the nodes d4 and D5 respectively appear in approximately the same position. In the frame member 450, the thin sides 450a are brought into contact with the optical low-pass filter 410 around the nodes d1 (or D1) and d4 (or D5) of the flexural vibration of the optical low-pass filter 410. In this arrangement, as the thin sides 450a support the vibration nodes with substantially zero amplitude, even when the optical low-pass filter 410 flexurally vibrates in any one of the fifth-order mode and the sixth-order mode, the flexural vibration of the optical low-pass filter 410 is almost undisturbed.

Figure 11:
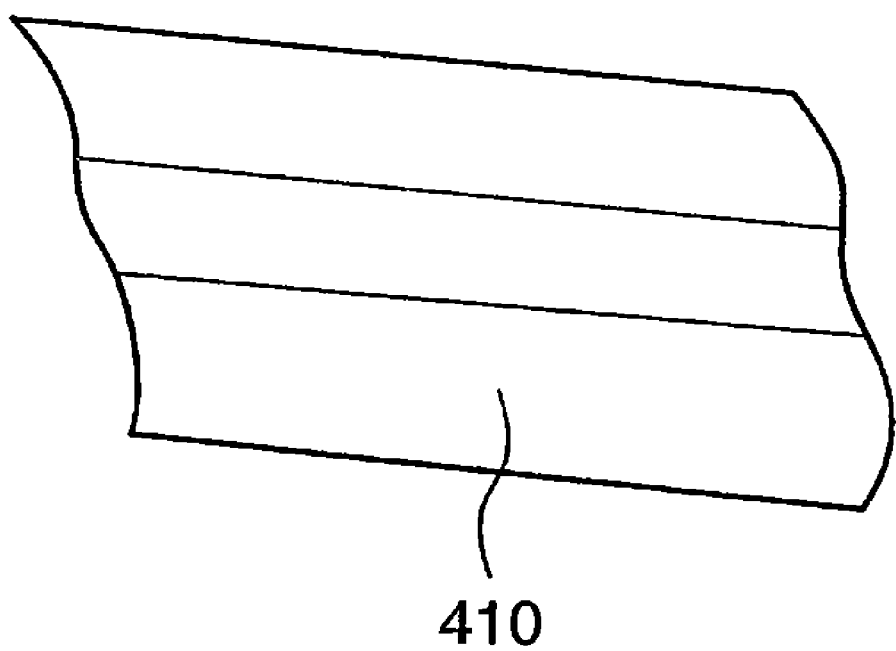
FIG. 11 depicts a perspective view showing the optical low-pass filter according to the first embodiment when it vibrates in a fifth-order mode.

On the other hand, as it is apparent from the flexural vibration form of the optical low-pass filter 410 shown in FIG. 11, it is impossible to bring the thick sides 450b into contact with the optical low-pass filter 410 at only the nodes of the flexural vibration. As the sides 450b are thicker than the sides 450a, the repulsion of the sides 450b with respect to deformation of the optical low-pass filter 410 is low, and the vibration absorbability is improved. Thus, the frame member 450 has advantages that it keeps vibration of the optical low-pass filter 410 undisturbed as much as possible and that it absorbs the vibration of the optical low-pass filter 410.

In this arrangement, even when the optical low-pass filter 410 flexurally vibrates, the image sensor 33 is almost not influenced by the vibration. As a result, the structure to receive the vibration can be limited. Further, as the flexural vibration of the optical low-pass filter 410 is almost undisturbed, the energy to drive the piezoelectric element 430 can be lowered.

Further, as the vibration of the optical low-pass filter 410 is almost not transmitted to the image sensor 33, breakage such as peeling of adhesive of the image sensor 33 can be prevented. Conversely, when shock such as falling is applied to the camera, the shock is hardly transmitted to the optical-low-pass filter 410. Accordingly, breakage of the optical low-pass filter 410 by the shock applied to the camera main body 1 can be prevented.

Further, as described above, although the sides 450b are thicker than the sides 450a, the thin sides 450a are in contact with the thick cover glass 33c (FIG. 7), while the thick sides 450b are in contact with the thin package 33a. In this arrangement, the thickness of the image sensing unit 400 can be almost uniform, and the image sensor 33 can be thinned. Further, the frame member 450 seals the clearance between the optical low-pass filter 410 and the image sensor 33, thus prevents entrance of foreign substance such as dust in this space.

Note that to fulfill the above function of the frame member 450, a rubber sheet, a sponge double-sided tape having a predetermined thickness, a gel sheet or the like can be used.

Further, it may be arranged such that the frame member 450 has a light shielding function so as to block unnecessary light ray incident on the image sensor 33 thereby preventing occurrence of ghost or flare.

Next, an operation of the present embodiment to remove dust or the like attached to the surface of the optical low-pass filter 410 will be described.

When the cleaning mode designation member 44 is operated by the photographer, a cleaning mode start command is received, and the camera main body 1 is set in the cleaning mode. Note that in the present embodiment, the cleaning mode designation member 44 is provided, however, the present invention is not limited to the cleaning mode designation member 44. For example, the cleaning mode designation member 44 is not limited to a mechanical button but may be realized with an instruction designated from a software menu displayed on the color LCD monitor 19 using a cursor key, a designation button or the like.

Further, the transition to the cleaning mode may be automatically performed in a general camera sequence such as power-on, or may be performed with reference to the number of photographing times or date. For example, when the number of photographing times becomes a predetermined number, the cleaning mode may be automatically started. Otherwise, when a predetermined period (predetermined days and hours) has elapsed since a previous cleaning, the cleaning mode may be automatically started.

The power supply circuit 110 supplies the necessary electric power for the cleaning mode to the respective elements of the camera main body 1. Further, in parallel with the power supply, the power supply circuit 110 detects the remaining battery capacity of the power supply unit 42 and transmits the result of detection to the MPU 100. When the MPU 100 receives a cleaning mode start signal, the MPU 100 sends a driving signal to the piezoelectric element driving circuit 111. The piezoelectric element driving circuit 111 receives the driving signal from the MPU 100, then generates two types of periodic voltages having a frequency to excite the fifth-order mode flexural vibration and a frequency to excite the sixth-order mode flexural vibration, and simultaneously or continuously applies these periodic voltages to the piezoelectric element 430. The piezoelectric element 430 contracts/expands in correspondence with the applied voltage, which causes flexural vibration of the optical low-pass filter 410.

Modification of First Embodiment

In the above-described first embodiment, the thickness of the respective sides of the frame member 450 are different in the optical axis direction. As a modification of the first embodiment, the width of the sides 450a and that of the sides 450b are different in a surface orthogonal to the optical axis. More particularly, in the surface orthogonal to the optical axis, the width of the sides 450a is wider than that of the sides 450b. As described above, as the long sides 450a support the vibration nodes with substantially zero amplitude, even when the width of the sides 450a are wide with priority on assembly workability, the flexural vibration of the optical low-pass filter 410 is almost undisturbed. On the other hand, as the short sides 450b have the narrower width, even when they are brought into contact with the loops of the flexural vibration of the optical low-pass filter 410, the short sides 450b hardly disturb the flexural vibration of the optical low-pass filter 410.

In this arrangement, even when the optical low-pass filter 410 flexurally vibrates, the image sensor 33 is almost uninfluenced by the vibration. As a result, the structure to receive the vibration can be limited. Further, as the flexural vibration of the optical low-pass filter 410 is almost undisturbed, the energy to drive the piezoelectric element 430 can be lowered. Further, as described above, the long sides 450a have a wide width, the frame member 450 can be easily assembled.

Second Embodiment

Figure 12:
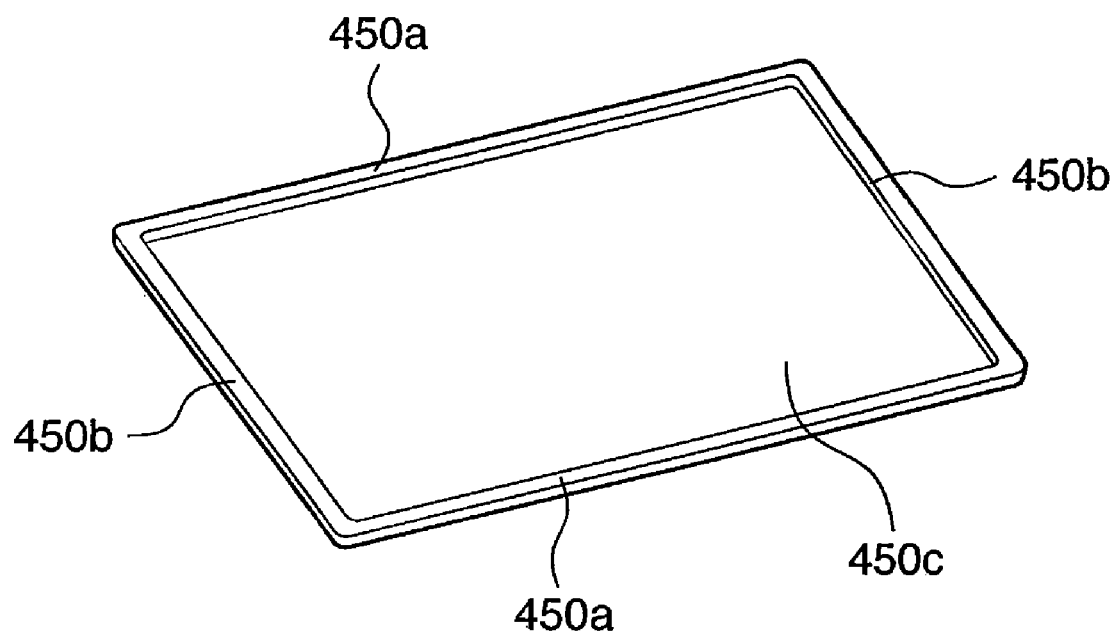
FIG. 12 depicts a perspective view showing the frame member according to a second embodiment of the present invention.
Figure 13:
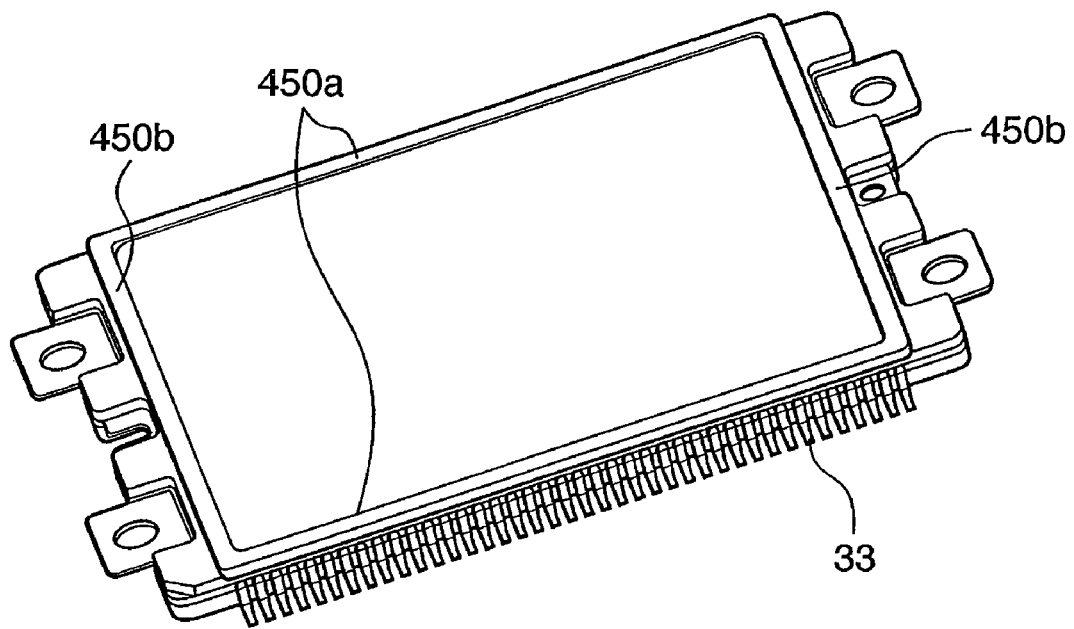
FIG. 13 depicts a perspective view showing the frame member and the image sensor constructing the image sensing unit according to the second embodiment.

Next, a second embodiment of the present invention will be described with reference to FIGS. 12 and 13. In FIGS. 12 and 13, constituent elements identical to those in the above-described first embodiment have the same reference numerals and the explanations thereof will be omitted.

FIG. 12 depicts a perspective view showing in detail the frame member 450 according to the second embodiment of the present invention.

The frame member 450 has the rectangular opening 450C for exposure of the image sensor 33, the long sides 450a parallel to the long sides of the image sensor 33 and the short sides 450b orthogonal to the long sides 450a. In the second embodiment, the long sides 450a and the short sides 450b are formed of members of mutually different materials. More particularly, the rigidity of the short sides 450b is lower than that of the long sides 450a by two-color molding or the like.

FIG. 13 depicts a perspective view showing the frame member 450 and the image sensor 33 constructing the image sensing unit 400 according to the second embodiment. As shown in FIG. 13, the entire perimeter of the frame member 450 is in contact with the package 33a of the image sensor 33.

As in the case of the above-described first embodiment, the long sides 450a are brought into contact with the optical low-pass filter 410 around the nodes d1 (or D1) and d4 (or D5) of the flexural vibration of the optical low-pass filter 410. As the long sides 450a support the vibration nodes having substantially zero amplitude, even when the optical low-pass filter 410 flexurally vibrates in any one of the fifth-order mode and the sixth-order mode, the long sides 450a hardly disturb the flexural vibration of the optical low-pass filter 410. Further, as the long sides 450a are formed from material with high rigidity, the accuracy of positioning of the frame member 450 with respect to the image sensor 33 can be improved, and further, the assembly workability can be improved.

On the other hand, the short sides 450b are brought into contact with the loops as well as the nodes of the flexural vibration of the optical low-pass filter 410. As the short sides 450b are formed of material with low rigidity, the repulsive force to the deformation of the optical low-pass filter 410 can be reduced, and the vibration absorbability can be improved. Thus, the vibration of the optical low-pass filter 410 is kept undisturbed as much as possible, and further, the vibration of the optical low-pass filter 410 can be absorbed.

In this arrangement, even when the optical low-pass filter 410 flexurally vibrates, the image sensor 33 is almost uninfluenced by the vibration. As a result, the structure to receive the vibration can be limited. Further, as the flexural vibration of the optical low-pass filter 410 is almost undisturbed, the energy to drive the piezoelectric element 430 can be lowered.

Further, as the vibration of the optical low-pass filter 410 is hardly transmitted to the image sensor 33, breakage such as peeling of adhesive of the image sensor 33 can be prevented. Conversely, when shock such as falling is imposed on the camera, the shock is hardly transmitted to the optical low-pass filter 410. Accordingly, breakage of the optical low-pass filter 410 by the shock imposed on the camera can be prevented.

Further, as described above, as the long sides 450a are formed from material with high rigidity, the assembly workability is not impaired. Further, the frame member 450 seals the clearance between the optical low-pass filter 410 and the image sensor 33, thus preventing foreign substances such as dust from entering into this space.

Third Embodiment

Next, a third embodiment of the present invention will be described with reference to FIG. 6.

The frame member 450 has the rectangular opening 450c for exposure of the image sensor 33, the long sides 450a parallel to the long sides of the image sensor 33 and the short sides 450b orthogonal to the long sides 450a.

In the third embodiment, an adhesive member is provided on surfaces of the long sides 450a on the optical axis side (surfaces in contact with the optical low-pass filter 410). Generally, adhesive members are known for their high viscous damping. As described above, the long sides 450a of the frame member 450 are brought into contact with the optical low-pass filter 410 around the nodes d1 (or D1) and d4 (or D5) of the flexural vibration of the optical low-pass filter 410. Even when the optical low-pass filter 410 flexurally vibrates in any one of the fifth-order mode and the sixth-order mode, as the long sides 450a support the vibration nodes with substantially zero amplitude, the flexural vibration of the optical low-pass filter 410 is almost undisturbed. On the other hand, the short sides 450b are brought into contact with loops as well as the nodes of the flexural vibration of the optical low-pass filter 410. However, as the surfaces of the short sides 450b in contact with the optical low-pass filter 410 are not provided with the adhesive member, the short sides 450b do not disturb the flexural vibration of the optical low-pass filter 410.

In this arrangement, even when the optical low-pass filter 410 flexurally vibrates, the image sensor 33 is almost uninfluenced by the vibration. As a result, the structure to receive the vibration can be limited. Further, as the flexural vibration of the optical low-pass filter 410 is almost unimpaired, the energy to drive the piezoelectric element 430 can be lowered.

Further, as the vibration of the optical low-pass filter 410 is hardly transmitted to the image sensor 33, breakage such as peeling of adhesive of the image sensor 33 can be prevented. Conversely, when shock such as falling is imposed on the camera, the shock is hardly transmitted to the optical low-pass filter 410. Accordingly, breakage of the optical low-pass filter 410 by the shock imposed on the camera can be prevented.

Further, as described above, as the surfaces of the long sides 450a brought into contact with the optical low-pass filter 410 are provided with the adhesive members, the sealing between the optical low-pass filter 410 and the image sensor 33 is further improved, and entrance of foreign substances such as dust into this space can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2006-271304, filed Oct. 2, 2006, which is hereby incorporated by reference herein in its entirety.

What is claimed is:

1. An image capturing apparatus, comprising:
an image sensor configured to convert an optical image of an object into an electric signal;
an optical member provided in front of the image sensor and on a photographing optical axis;
a vibration unit configured to apply vibration to the optical member; and
a frame member, having a rectangular opening to pass the optical image through an image sensing surface of the image sensor, being held between the optical member and the image sensor and in direct contact with the optical member and the image sensor and sealing between the optical member and the image sensor,
wherein in the frame member, a first pair of opposing sides and a second pair of opposing sides being different from the first pair of opposing sides are integrally formed, the first pair of opposing sides is brought into contact with the optical member at nodes of vibration of the optical member that is vibrating by the vibration of the vibration unit, and a thickness of the second pair of opposing sides in a direction of the photographing optical axis is thicker than that of the first pair of opposing sides in the direction of the photographing optical axis so that the frame member seals between the optical member and the image sensor without disturbing vibration of the optical member.

2. The image capturing apparatus according to claim 1, wherein members of the first pair of opposing sides are fixed to the optical member, while members of the second pair of opposing sides are not fixed to the optical member.

3. The image capturing apparatus according to claim 1, wherein the first pair of opposing sides are long sides of the frame member, while the second pair of opposing sides are short sides of the frame member.

4. The image capturing apparatus according to claim 1, wherein the optical member has an approximately rectangular shape, and the optical member modulates an incident light beam to a desired light beam and radiates the desired light beam.

5. The image capturing apparatus according to claim 1, wherein the optical member is an infrared filter.

6. The image capturing apparatus according to claim 1, wherein the frame member has a light shielding property.

7. An image capturing apparatus, comprising:
an image sensor configured to convert an optical image of an object into an electric signal;
an optical member provided in front of the image sensor and on a photographing optical axis;
a vibration unit configured to apply vibration to the optical member; and
a frame member, having a rectangular opening to pass the optical image through an image sensing surface of the image sensor, being held between the optical member and the image sensor and in direct contact with the optical member and the image sensor and sealing between the optical member and the image sensor,
wherein in the frame member, a first pair of opposing sides and a second pair of opposing sides being different from the first pair of opposing sides are integrally formed, the first pair of opposing sides is brought into contact with the optical member at nodes of vibration of the optical member that is vibrating by the vibration of the vibration unit, and a width of the first pair of opposing sides in a surface orthogonal to the photographing optical axis is wider than that of the second pair of opposing sides in a surface orthogonal to the photographing optical axis, so that the frame member seals between the optical member and the image sensor without disturbing vibration of the optical member.

8. The image capturing apparatus according to claim 7, wherein members of the first pair of opposing sides are fixed to the optical member, while members of the second pair of opposing sides are not fixed to the optical member.

9. The image capturing apparatus according to claim 7, wherein the first pair of opposing sides are long sides of the frame member, while the second pair of opposing sides are short sides of the frame member.

10. The image capturing apparatus according to claim 7, wherein the optical member has an approximately rectangular shape, and the optical member modulates an incident light beam to a desired light beam and radiates the desired light beam.

11. The image capturing apparatus according to claim 7, wherein the optical member is an infrared filter.

12. The image capturing apparatus according to claim 7, wherein the frame member has a light shielding property.

13. An image capturing apparatus, comprising:
an image sensor configured to convert an optical image of an object into an electric signal;
an optical member provided in front of the image sensor and on a photographing optical axis;
a vibration unit configured to apply vibration to the optical member; and
a frame member, having a rectangular opening to pass the optical image through an image sensing surface of the image sensor, being held between the optical member and the image sensor and in direct contact with the optical member and the image sensor and sealing between the optical member and the image sensor,
wherein in the frame member, a first pair of opposing sides and a second pair of opposing sides being different from the first pair of opposing sides are integrally formed, the first pair of opposing sides is brought into contact with the optical member at nodes of vibration of the optical member that is vibrating by the vibration of the vibration unit, and the rigidity of the second pair of opposing sides is lower than that of the first pair of opposing sides, so that the frame member seals between the optical member and the image sensor without disturbing vibration of the optical member.

14. The image capturing apparatus according to claim 13, wherein members of the first pair of opposing sides are fixed to the optical member, while members of the second pair of opposing sides are not fixed to the optical member.

15. The image capturing apparatus according to claim 13, wherein the first pair of opposing sides are long sides of the frame member, while the second pair of opposing sides are short sides of the frame member.

16. The image capturing apparatus according to claim 13, wherein the optical member has an approximately rectangular shape, and the optical member modulates an incident light beam to a desired light beam and radiates the desired light beam.

17. The image capturing apparatus according to claim 13, wherein the optical member is an infrared filter.

18. The image capturing apparatus according to claim 13, wherein the frame member has a light shielding property.

* * * * *